UNITED STATES PATENT OFFICE.

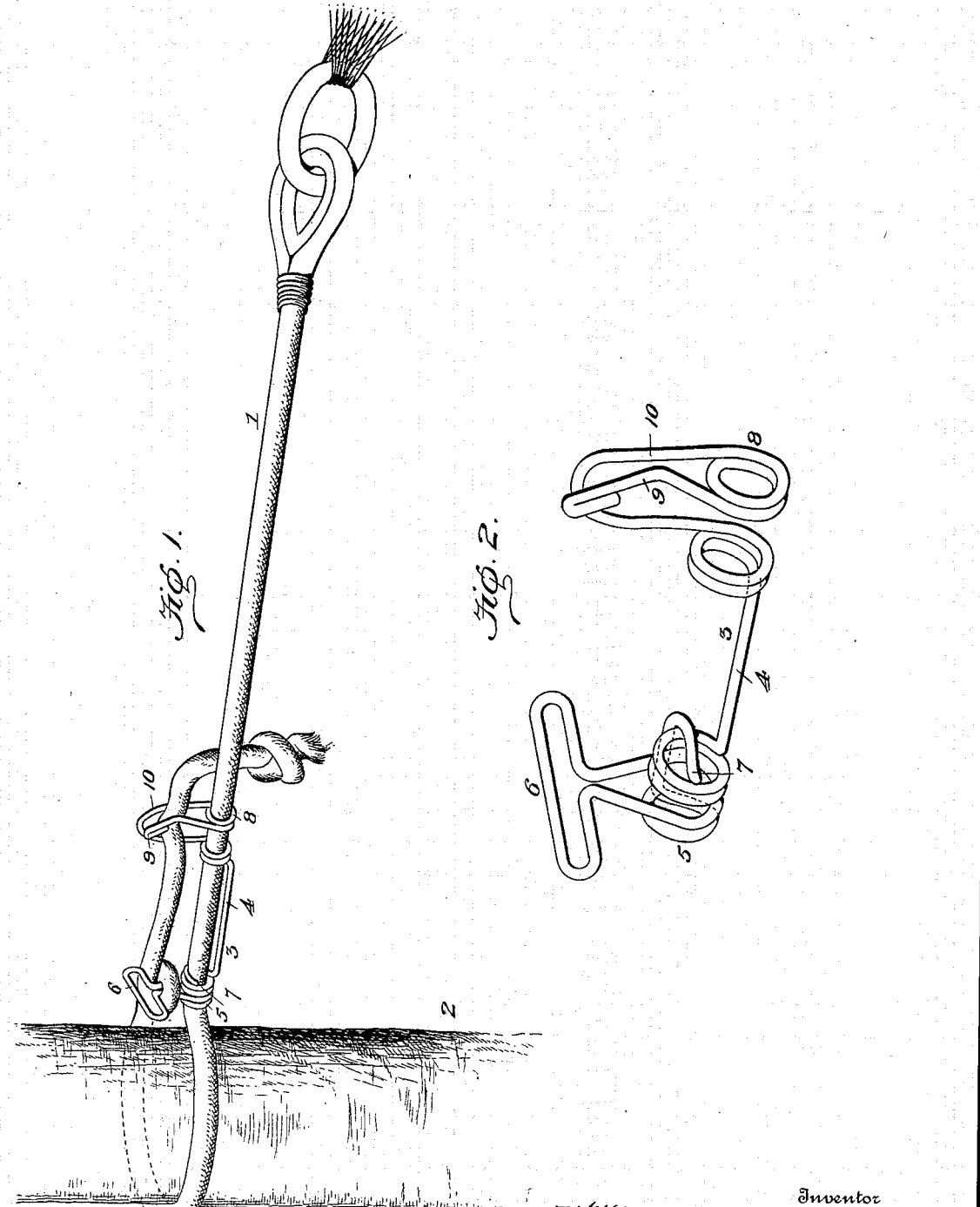

WILLIAM R. GORRELL, OF CARSINS RUN, MARYLAND, ASSIGNOR OF TWO-THIRDS TO R. HARRY WEBSTER AND SEPTIMUS DAVIS, OF ABERDEEN, MARYLAND.

ROPE-CLAMP.

SPECIFICATION forming part of Letters Patent No. 612,160, dated October 11, 1898.

Application filed February 23, 1898. Serial No. 671,261. (No model.)

*To all whom it may concern:*

Be it known that I, WILLIAM R. GORRELL, a citizen of the United States, residing at Carsins Run, in the county of Harford and State of Maryland, have invented certain new and useful Improvements in Rope-Clamps; and I do declare the following to be a full, clear, and exact description of the invention, such as will enable others skilled in the art to which it appertains to make and use the same.

My invention has relation to rope-clamps, more particularly designed for hammock-ropes and halters, but which may be used for any other purposes desired wherein a secure rope-clamp is required.

The object of my invention is to provide a simple, durable, and inexpensive clamp capable of quick adjustment and which will securely hold the rope to which it is applied against slipping.

With this object in view the invention consists in certain features of construction and combination of parts, which will be hereinafter fully described and claimed.

In the accompanying drawings, Figure 1 is a perspective view showing my invention engaged with a rope, the rope being attached to the trunk of a tree or other support; and Fig. 2 is an enlarged detail perspective view of the clamp.

In said drawings, 1 denotes the rope, which for the purpose of illustration I will term the "suspending-rope" of a hammock.

2 denotes a support—such, for instance, as a post or tree—and 3 denotes the clamp. This clamp is preferably made of a single piece of wire, having a longitudinal body portion 4, one end of which is formed with coils 5, an upwardly-extending cleat 6, and a laterally-projecting spring-tongue 7, while the other end is formed with coils 8 and two coacting spring-jaws 9 and 10, the latter being in the form of a loop.

The rope is passed through both sets of coils and then around the tree or support. It is then wound around the cleat, as shown, and is finally passed between two spring-jaws, which forms a kink in the rope, thus holding the rope where it is wrapped around the cleat.

Strain applied to the draft end of the rope cannot possibly cause the rope to slip around the support, as it is securely retained against movement by the cleat and clamping-jaws.

Should the strain be released from the rope, the ordinary tendency would be for the loop surrounding the tree or support to spread, and thereby allow it to drop to the ground, slipping down from the tree or support. To overcome this difficulty, I provide the spring-tongue 7, which has a frictional engagement with the rope, so that when the strain is suddenly released the loop that surrounds the support will not be allowed to enlarge, thereby holding the rope to the support at its adjusted height.

To remove the rope from the support, all that is necessary is to slip the rope from between the spring-jaws and unwind it from the cleat, thus enabling a person to easily and quickly detach the parts.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. A rope-clamp consisting of a body portion provided with coils at its ends, a cleat arranged at one end, and clamping-jaws arranged at the other end, substantially as set forth.

2. A rope-clamp consisting of a body portion provided with coils, a cleat arranged at one end, clamping-jaws arranged at the other end, and a spring-tongue arranged at one of the ends of the coils, substantially as set forth.

3. A rope-clamp consisting of a body portion provided with coils, a cleat arranged at one end, clamping-jaws arranged at the other end, a spring-tongue arranged at one of the ends of the coils, said parts being constructed from a single piece of wire bent to form, substantially as set forth.

In testimony whereof I have hereunto set my hand in presence of two subscribing witnesses.

WILLIAM R. GORRELL.

Witnesses:
 EUGENE DELL,
 R. L. MORGAN.